United States Patent [19]

Thompson

[11] Patent Number: 4,706,935
[45] Date of Patent: Nov. 17, 1987

[54] POST PULLER

[76] Inventor: Gregory L. Thompson, P.O. Box 266, Lowell, Fla. 32663

[21] Appl. No.: 918,900

[22] Filed: Oct. 15, 1986

[51] Int. Cl.⁴ ............................................. E21B 19/00
[52] U.S. Cl. .................................. 254/29 R; 254/30; 254/132
[58] Field of Search ............... 254/29 R, 30, 124, 132, 254/133 R, 31; 172/111, 439

[56] References Cited

U.S. PATENT DOCUMENTS

| | | | |
|---|---|---|---|
| 2,124,154 | 7/1938 | Sovincz | 254/30 |
| 2,482,950 | 9/1949 | Toftey | 254/30 |
| 2,553,077 | 5/1951 | Braun | 254/132 |
| 2,662,729 | 12/1953 | Fountain | 254/124 |
| 3,059,905 | 10/1962 | Tompkins | 254/30 |
| 3,479,012 | 11/1969 | Korczynski | 254/132 |
| 3,647,185 | 3/1972 | Phibbs | 254/30 |
| 4,026,522 | 5/1977 | Dranselka | 254/30 |
| 4,226,402 | 10/1980 | Muth | 254/30 |
| 4,256,286 | 3/1981 | Hudgins | 254/30 |

Primary Examiner—Frederick R. Schmidt
Assistant Examiner—Judy J. Hartman
Attorney, Agent, or Firm—Charles A. Bevelacqua

[57] ABSTRACT

A machine for extracting an elongate work piece from a medium in which it is imbedded. The machine includes a vertical gripping plate in opposed gripping relating with an eccentrically pivoted gripper. These gripping elements are carried on a rigid frame adapted for attachment to the three point hitch lifting mechanism found on tractors. When the work piece is gripped between the gripping elements, lifting of the frame by means of the lifting mechanism of the tractor, will extract the work piece. Auxiliary lifting force may be provided with optional fluid power operated cylinders. Linkages may optionally be provided to remotely move the pivoted gripper into and out of gripping relation. The linkages may be operated manually or with a hydraulic or other power operated cylinder.

5 Claims, 6 Drawing Figures

U.S. Patent  Nov. 17, 1987  Sheet 1 of 2  4,706,935
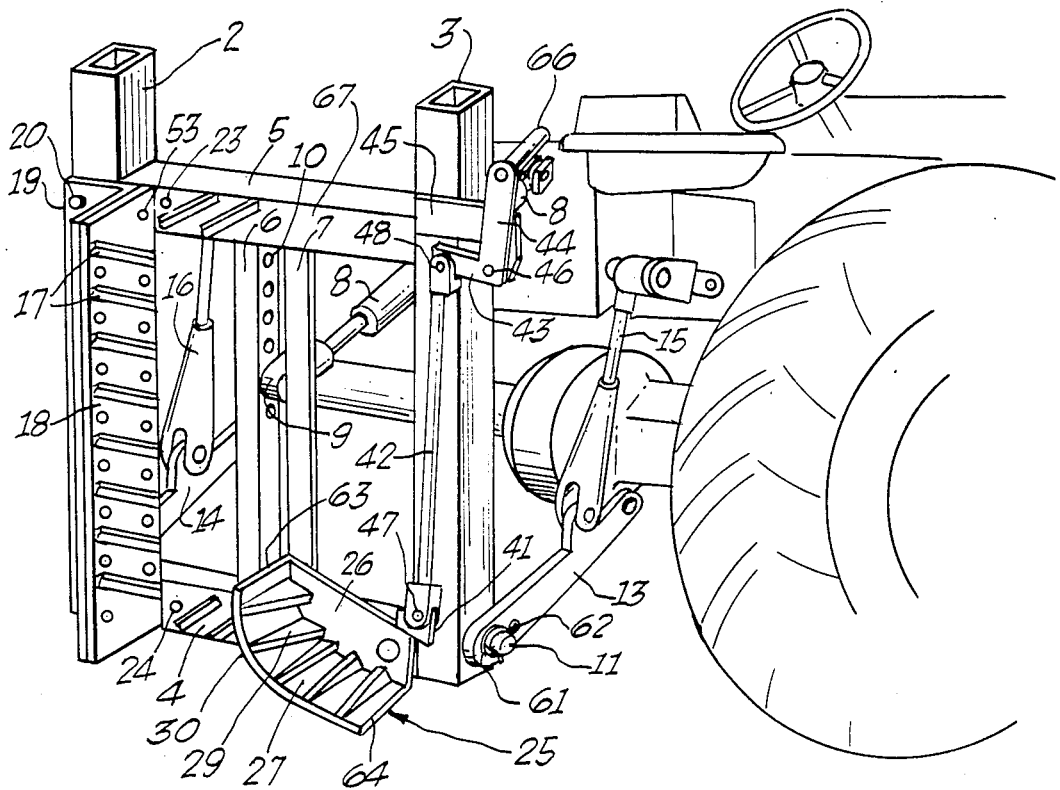
Figure 1.
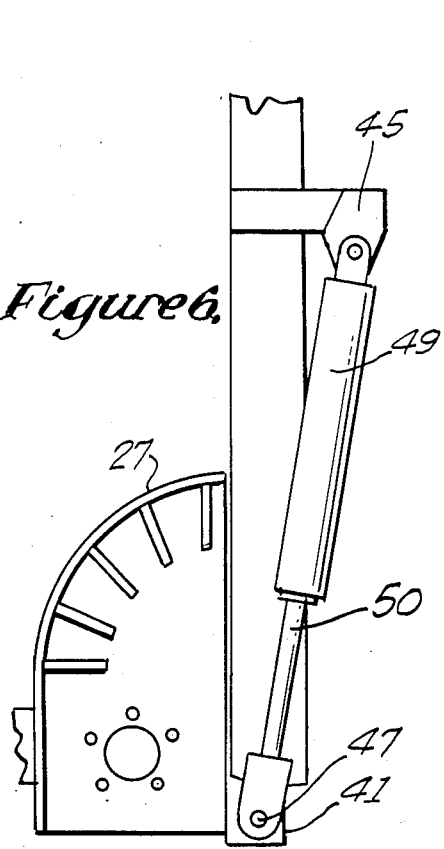
Figure 6.
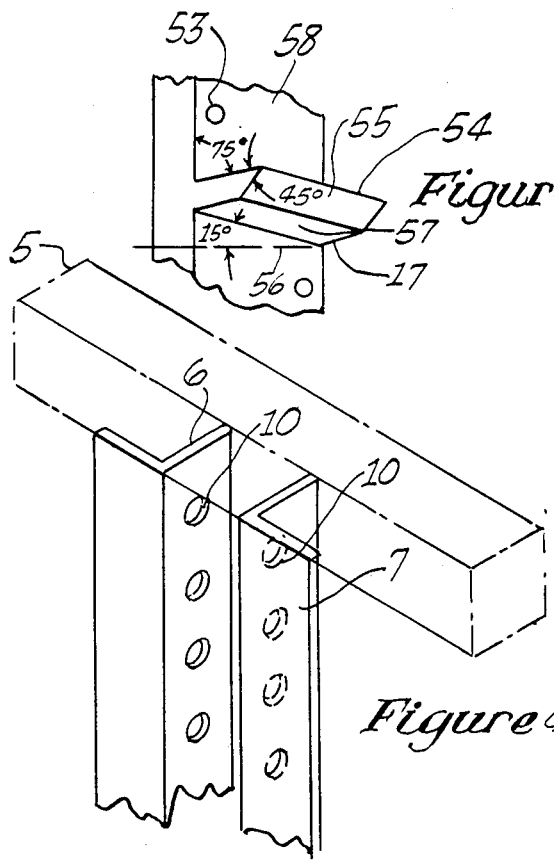
Figure 5.
Figure 4.

1

POST PULLER

BACKGROUND OF THE INVENTION

This invention relates to a machine and method for extracting fence posts, drills or other elongate work piece from the ground or other medium in which they may be imbedded. Particularly, it relates to such a device which is adapted for attachment to and operation from the three point hitch of a farm tractor or similar machine.

Various devices have been previously disclosed which can be attached to a tractor or other machine and used to pull a fence post or drill or the like. Some of these are large and awkward and unsuitable for a relatively small tractor, others require that the operator of the tractor dismount and manipulate parts of the puller to engage it with the work piece or require a second person to perform this operation, some provide only limited engagement with the work piece and do not secure a sufficient grip to remove a work piece that is firmly imbedded and others use power operated grippers or other power appliances which make them large, cumbersome and expensive. Another objectionable feature of some of the prior art devices is that their gripping or pulling structure tends to impart rotational motion to the work piece being pulled. This makes it more difficult to pull the work piece and may bend or break it. In some cases when the work piece is pulled clear of the medium in which it is imbedded the rotational force applied may cause it to twist violently, potentially causing damage to the machine or injury to persons in the vicinity. The invention disclosed herein is designed to avoid all of these objectionable characteristics.

SUMMARY OF THE INVENTION

For clarity and simplicity the invention is described and illustrated with respect to its use for pulling fence posts. The invention consists of a base frame provided with means for attaching it to the three point hitch mechanism of a tractor and including a vertical gripping plate which has teeth for engaging a fence post to be lifted out of the ground. An eccentrically pivoted gripper is provided in opposed relation to the gripping plate and is also provided with gripping teeth. When the device is positioned with the gripping plate adjacent one side of a post to be removed and the pivoted gripper contacting the other side of the post, lifting of the frame by means of the lifting mechanism provided on the tractor will cause the post to be more tightly gripped because of the eccentric pivoting of the gripper and as lifting continues the post will start to move out of the ground. The attaching links of the three point hitch are attached to the base frame in such a manner that they will remain parallel to each other during the lifting operation imparting a substantially linear motion to the post as it is being pulled out of the ground. As will be explained in greater detail the pivoted gripper may be rotated on its pivot by friction and gravity to open and close as required to engage and release a post but preferably a spring may be provided to help urge it into engaging position and manual or power operated linkages may also be provided to control the engagement and disengagement of the pivoted gripper with a post being pulled. A substantial range of adjustment is available due to the eccentric mounting of the gripper but the device can be made to work on an even greater range of post sizes by providing adjustment of the position of the vertical gripping plate.

It is an object of this invention to provide a post puller which is simple in construction but durable and effective in use.

It is another object of this invention to provide a post puller for attachment to the three point hitch of a tractor and which can be used by the operator of the tractor without the necessity of dismounting to engage or disengage the puller from the post.

Another object of this invention is to provide such a post puller which is attached to the three point hitch of a tractor in such a manner as to apply a generally vertical force to the post being pulled rather than an arcuate force tending to rotate the post along its length.

Still another object of this invention is to provide a puller capable of pulling not only wooden posts but also metal pipes, steel rods, drills and other large smooth objects from the ground or from a medium in which they may be imbedded.

Another object of this invention is to provide a post puller which will work with posts of a wide range of lengths and diameters and virtually any cross sectional shape.

These and other objects, features and advantages of this invention will become apparent from the following description in conjunction with the accompanying drawings.

BRIEF DESCRIPTION OF THE DRAWINGS

FIG. 1 is an overall view of the invention attached to the rear of a farm tractor.

FIG. 4 is a fragmentary view showing the attaching means for the center link of the three point hitch of a tractor.

FIG. 5 is a fragmentary view showing details of the gripping teeth and of their attachment to the vertical gripping plate.

FIG. 6 is a partial view of the invention showing a modification wherein a hydraulic cylinder is used to engage and disengage the movable jaw of the gripping apparatus.

DESCRIPTION OF THE PREFERRED EMBODIMENTS

Figure 2:
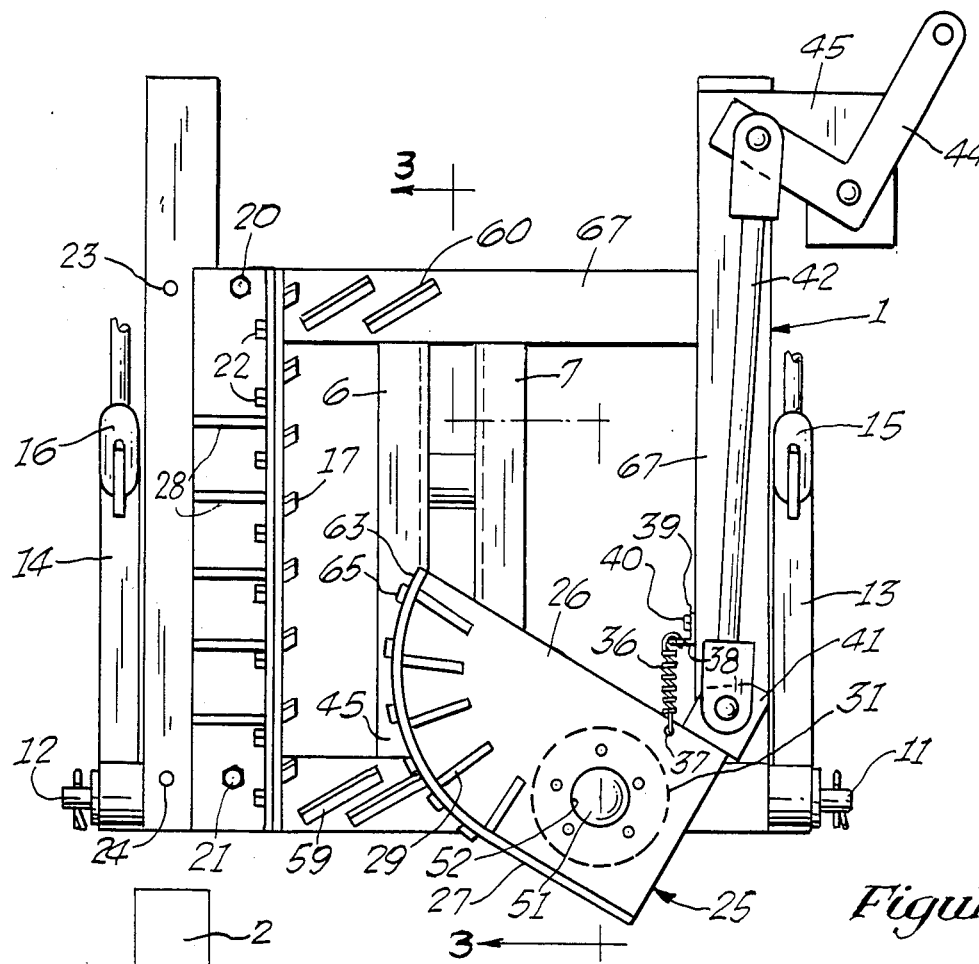
FIG. 2 is an elevational view of the preferred embodiment of the invention viewed from the side which would face a post to be pulled.

Referring now to FIGS. 1 and 2, it will be seen that the apparatus of the invention comprises a base frame 1 which may be constructed of square or box tubing as shown or of any other suitable structural elements. The base frame is constructed of vertical frame members 2 and 3 and horizontal frame members 4 and 5. The frame members are welded together or otherwise permanently joined to form a rigid substantially rectangular base frame which has a substantially unobstructed smooth, flat face 67. A pair of center mounting plates 6 and 7 extend between horizontal frame members 4 and 5 and are welded or rigidly secured thereto to provide a connection point for the end 9 of center link 8, a freely pivoting link which is a part of the three point hitch of a tractor. Mounting plates 6 and 7 may be made of angle iron as indicated and have a corresponding series of holes 10 as best seen in FIG. 4, for receiving a bolt or pin (not shown) by which the center link 8 is connected to the base frame. Support shafts 11 and 12 are rigidly secured to the base frame as by welding to provide a place for connection of the pivot links 13 and 14 to the base frame. Lifting links 15 and 16 are pivoted in unison in a vertical plane under power from the tractor and are pivotally connected to the pivot links 13 and 14. Lifting links 15 and 16 will raise or lower pivot links 13 and 14, which in turn will cause the base frame 1 to be raised or lowered vertically when the three point hitch mechanism is activated. Center link 8 and links 13, 14, 15, and 16 are all parts of the three point hitch mechanism of the tractor and form no part of this invention. They are shown herein for purposes of illustration only. When connecting the implement to a tractor, the connection between center link 8 and the center mounting plates 6 and 7 is made at the mounting hole 10 which will place center link 8 in a position parallel with the position of pivot links 13 and 14 and its length adjusted so that it is approximately the same length as the latter. Center mounting plates are constructed so the holes 10 lie in approximately the same vertical plane which includes the axes of the support shafts 11 and 12. This will cause a post being pulled out of the ground to remain in a substantially vertical position as it is raised so that it will be pulled with the least amount of resistance and avoid any tendency of the post to rotate when it is pulled out of the ground.

Figure 3:
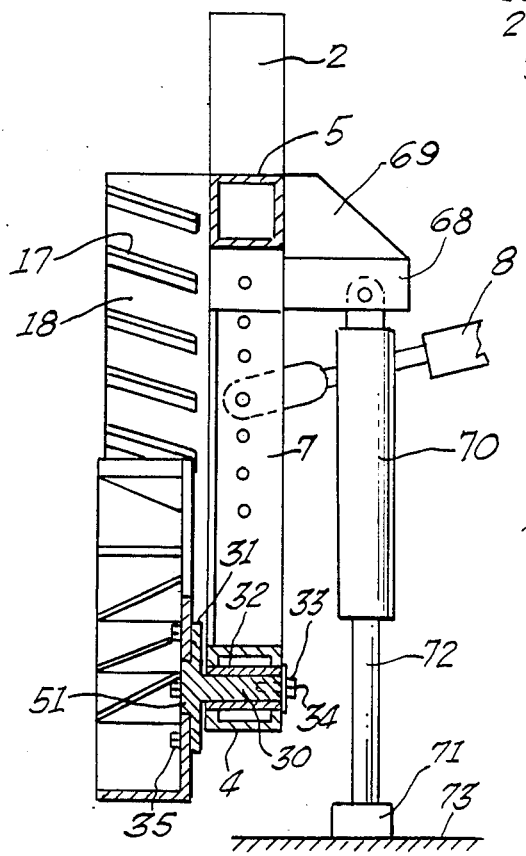
FIG. 3 is a cross-sectional view of the apparatus taken along the line 3—3 in FIG. 2 and shows an optional fliud power clyinder for increased lifting force.

A vertical gripping plate 18 is provided with a series of gripping teeth 17 which are welded or otherwise rigidly secured thereto. The gripping plate is secured to a support angle 19 which in turn is secured, as by bolts 20, to vertical frame member 2. Gripping plate 18 may be secured to the support angle 19 by means of a series of bolts 22. Alternate threaded holes 23 and 24 may be provided in horizontal frame members 4 and 5 to provide for step-by-step adjustment of the position of the gripping plate 18 to handle different ranges of thicknesses or diameters of fence posts or other work pieces. Variations in size of the work piece within a given range are handled by the eccentric pivoting of pivoted gripper 25 as will hereinafter be more completely described. Support angle 19 is reinforced by means of triangular gusset plates 28 rigidly secured thereto as by welding. Pivoted gripper 25 comprises a back plate 26, contact plate 27 permanently attached to said backing plate, as by welding, and reinforced with gusset plates 29 which may be of triangular shape. Gripper 25 is positioned so that contact plate 27 is in opposed relation with gripping plate 18 and is pivoted by suitable means to horizontal frame member 4. The distal end 63 of contact plate 27 is curved and the center of the pivot means between gripper 25 and horizontal frame member 4 is located eccentrically with respect to the curvature of contact plate 27. Therefore, as gripper 25 pivots downwardly as shown in FIGS. 1 and 2 the distance between gripping plate 18 and the opposing surface of contact plate 27 will decrease. As shown in FIG. 3, the pivot means between gripper 25 and horizontal frame member 4 may consist of a shaft 30 having an enlarged hub or disc 31, a bushing 32 mounted in the frame member, a retaining bolt 33 and washer 34, and a series of attaching bolts 35 for engaging threaded bones (not shown) in said hub whereby the gripper 25 may be mounted on the hub 31. A centering projection 51 may be formed integrally with hub 31 and pivot shaft 30. In such case, back plate 26 is provided with a bore 52 closely approximating the diameter of projection 51. As will be obvious to those skilled in the art, various other means of mounting gripper 25 to the frame 1 may be provided including, for example, a fixed axle (not shown) projecting from horizontal frame member 4 and a hub (not shown) suitable retained on said axle and provided with roller or other form of bearings (not shown) for rotation on said axle. Pivoted gripper 25 is biased toward its horizontal position by a spring 36 which has one end hooked into an aperture 37 in the back plate of the gripper and has its other end engaged in an aperture 38 in a spring retainer suitably attached to vertical frame member 3 as, for example, by a bolt 40.

As will be explained later, the implement can be made to operate efficiently without any additional mechanism connected with the pivoted gripper. However, it has been found desirable to provide positive operating means as will now be described: A tab or extension plate 41 is provided on the back plate 26 of pivoted gripper 25 which is connected by a connecting rod 42 to a pivoted link 43. A handle 44 is made integral with link 43 and extends substantially at right angles thereto in a position where it may be grasped and manipulated by the operator of the tractor. A suitable extension or handgrip 66 may be provided to facilitate operation of the link 43 by the operator of the tractor. The link 43 and handle 44 are pivotally supported by a pivot pin 46 connected to an extension plate 45 which is rigidly secured to vertical frame member 3 by welding or other suitable means. Connecting rod 42 is pivotally connected at one end to the distal end of pivoted link 43 and is pivoted at its other end by pivot 47 to the tab 41 on gripper 25.

FIG. 6 shows an alternate form of operator for controlling the position of pivoted gripper 25 in which a double-acting hydraulic cylinder 49 is connected between tab 41 on the gripper 25 and extension plate 45 in a manner well known in the art. Extension or retraction of piston rod 50 will impart the desired pivotal movement of pivoted gripper 25. In this embodiment of the invention, biasing spring 36 shown in FIG. 2 may be dispensed with.

Optional auxiliary gripping teeth as shown at 59 and 60 in FIG. 2 may be provided on the horizontal frame members 4 and 5 respectively.

FIG. 5 shows the details of the gripping teeth and their mounting on vertical gripping plate 18. Each gripping tooth is cut so that the angle between its front face 55 and its top surface 54 is approximately 45 degrees. The teeth are mounted so that the angle between the bottom edge 57 of the tooth where it joins the gripping plate is approximately 15 degrees above a horizontal line indicated by the numeral 56 and so that the angle between the top surfce of the tooth and the vertical face of plate 18 is approximately 75 degrees. These angles are in no way critical but appear to improve operation of the post puller as will be described later.

If it is desired to provide auxiliary lifting power to extract trees or other firmly imbedded work pieces, the horizontal frame member 5 may be provided with brackets 68 rigidly secured to frame member 5, as by welding, and reinforced by gusset plates 69. Hydraulic cylinders 70 are secured to brackets 68 and have their piston rods 72 suitably attached to pads 71. As force is being applied through the three point hitch lifting mechanism, pressure fluid may also be directed to the cylinders 70 to extend the piston rods 72 until pads 71 contact the ground 73. Further extension of piston rods 72 will apply a lifting force to horizontal frame member 5, base frame 1 and the work piece.

OPERATION OF THE INVENTION

To connect the machine to a three point hitch, the pivot links 13 and 14 are slid over the axles 11 and 12 and retained there as by washer 61 and cotter pin 62. The center link 8 is adjusted and positioned so that it can be engaged with one of the sets of mounting holes 10 in the mounting plates 6 and 7 in a position in which the link 8 will be substantially parallel with and substantially of the same length as the links 13 and 14. Link 8 is then pivotally connected to mounting plates 6 and 7 by suitable means such as a bolt and nut (not shown). The base frame is then raised by means of the three point hitch and the implement is backed up to a post to be removed. Gripping plate 18 will have previously been adjusted to a position in which the minimum gap between gripping plate 18 and the toe or distal end 63 of contact plate 27 is substantially less than the thickness of the post to be removed when the gripper 25 is in its horizontal position substantially as illustrated in FIG. 1. The distance between vertical gripping plate 18 and the opposite end 64 of contact plate 27 when the pivoted gripper 25 is in its substantially vertical position should also be greater than the maximum thickness of the range of thicknesses of the posts to be worked on. The implement is backed into the post so that the arcuate portion 30 of the contact plate 27 is in slight frictional engagement with the post. The base frame is lowered by means of the three point hitch while the tractor is held stationary or continues to be moved slightly toward the post. The gripper 25 will be pivoted toward its open position and, since there will be a slight arcuate movement of the base frame toward the post and be positioned on either side of it. The post will be positioned between the gripper plate 18 and the contact plate 27 and be engaged by the teeth 17 and 65 respectively. The three point hitch is then moved to its lower-most position and then raised. As the three point hitch is lowered, the gripping teeth will slide freely down along the post, tending to slightly open the gripper. Raising the three point hitch, and consequently, the base frame, will cause the teeth 17 and 65 to bite into the post gripping it tightly and eventually will begin to move it upward out of the ground. If the post in imbedded in the ground a greater distance than it can be pulled up by one stroke of the three point hitch mechanism, the base frame is lowered and raised, with the results described above, as many times as is necessary to completely extract the post from the ground. When the post is extracted, the three point hitch mechanism is raised to a position at or near the top of its stroke and then lowered. The bottom end of the post is allowed to strike the ground and the three point hitch mechanism continued to be lowered. This will cause the post to be released and to fall out of the grip of the gripper.

According to the foregoing description of operation the implement may be operated without external means to pivot the gripper 25. However, it is preferred to provide means previously described, including handle 44 and connecting rod 42, to permit manual operation of gripper 25. The gripper may be held in its open position with the mechanism just referred to as the tractor is backed up to the post. The gripper is then pivoted closed, the three point hitch mechanism lowered then raised to extract the post as previously described. The operation is the same when a hydraulic cylinder 49 is provided except that the opening and closing of the pivoted gripper is effected by the power means rather than manually.

It can be seen that as force is applied to raise the post the inclination of the teeth on the gripping plate 18 will tend to cause the post to slide inward toward the horizontal frame members 4 and 5 and will overcome any tendency of the implement to lose its grip on the post. If optional auxiliary teeth 59 and 60 are provided a still stronger grip of the post will be provided when it slides back far enough to engage the auxiliary teeth. The inclination of the teeth above the horizontal will hold the post against sidewise slippage, while the sharp edge formed by the angle between the surfaces 54 and 55 of the teeth will increase their tendency to bite into and lift the post.

As the three point mechanism is lifted from a position where the links 8, 13 and 14 slope downward toward the ground from front to rear of the tractor, the base frame 1 will remain in a substantially vertical position as it is lifted but the entire frame will move in a slightly arcuate motion rearward toward the post until the links reach a position substantially parallel with the ground. This will further cause the post to move into the base frame and into engagement with the horizontal frame members 4 and 5 or the auxiliary gripping teeth 59 and 60. As the links 8, 13 and 14 continue to move upward past the horizontal position the base frame will be moved in a slightly arcuate path in a direction away from the post. However, the tight grip of the post by the gripping mechanism coupled with the angle at which the teeth are mounted on the gripping plate prevent the escape of the post from the gripping mechanism. It is further found that if the tractor is not locked in position with respect to the ground, a slight forward and back motion of the tractor will result but the base frame will remain in and be moved in a substantially vertical plane. Any tendency of the mechanism and post to be rotated about the axis of the shafts 11 and 12 will be substantially completely obviated.

If the device is provided with the auxiliary lifting mechanism previously described and it is desired to utilize the auxiliary lift capability, pressure fluid is admitted to the cylinder 70 to extend piston rod 72 at the time when the three point hitch mechanism is activated to apply lift to base frame 1 and pressure fluid is routed to retract piston rod 72 when the three point hitch mechanism is lowered.

Operation of the invention has been described above in connection with its use to pull out posts or other work pieces of wood or other substantially soft material into which the gripping teeth will bite for improved grip. When it is desired to pull pipe, metal fence posts, drills or similar items, the vertical gripping plate 18 shown, which is provided with teeth 17 may be removed by removing the bolts 22 and replaced with an alternate gripping plate (not shown) provided with a rubber or other elastomeric or plastic gripping surface or with other frictional material. This alternative gripping plate could be used with the pivoted gripper as shown or with one which is also provided with one of the frictional gripping surfaces described above.

It is to be understood that the invention disclosed herein is not limited to the details of construction and arrangement of parts illustrated in the accompanying drawings but is capable of being practiced or carried out in various ways. Furthermore, the terminology employed herein is for the purpose of description only and is not to be considered as a limitation.

It is obvious to those skilled in the art that although the invention has been shown and described in one or more preferred embodiments, many variations may be made in the form and structure here presented without departing from the scope of the present invention as set forth in the appended claims.

What is claimed is:

1. A machine for extracting an elongate work piece from a medium in which it is imbedded, said machine being adapted to be attached to and operated by a conventional three point hitch mechanism of a tractor, said three point hitch mechanism comprising a freely pivotable center link and two pivot links which may be operated in reciprocating vertical motion under power by lifting links, said machine comprising a substantially rigid frame, means for securing said frame to said three point hitch mechanism for reciprocating vertical motion in response to corresponding vertical motion of said pivot links, adjustable means for connecting said frame to said center link whereby said center link will remain substantially parallel to said pivot links and said frame will remain substantially vertical during vertical motion of said pivot links and said frame, means on said frame for engaging a work piece to be extracted, said means comprising a vertical gripping plate having gripping teeth for engaging the work piece, said vertical gripping and each of the gripping teeth on said gripping plate having a substantially flat top surface, and the included angle between the flat top surface of at least one of said teeth and said vertical flat front surface of said gripping plate being substantially less than ninety (90) degrees.

2. A machine as set forth in claim 1 wherein said vertical gripping plate has a substantially vertical flat front surface, said frame has a substantially smooth outer face lying in a substantially flat plane substantially perpendicular to and intersecting the flat front surface of the vertical gripping plate, the gripping teeth on said vertical gripping plate have a substantially flat top surface and at least one of said gripping teeth is attached to the flat front surface of said vertical gripping plate so that its flat top surface slopes downward toward said smooth outer face of said frame whereby a work piece engaged by said at least one of said gripping teeth tends to slide toward the frame when the work piece is being pulled upward.

3. A machine as set forth in claim 2 further having auxiliary gripping teeth on the substantially smooth outer face of said frame to further engage a work piece being extracted.

4. A machine as set forth in claim 1 wherein said means on said frame for engaging a work piece further comprising an eccentrically pivoted gripper comprising a contact plate provided with gripping teeth and arranged in juxtaposition with said vertical gripping plate and said machine further having means for step by step adjustment of the position of the vertical gripping plate toward and away from the center of rotation of said pivoted gripper.

5. A machine as set forth in claim 4 further having means for resiliently urging said pivoted gripper for rotation in a direction to reduce the distance between the contact plate of said pivoted gripper and the vertical gripping plate.

* * * * *